United States Patent [19]

Breuser et al.

[11] Patent Number: 4,509,476
[45] Date of Patent: Apr. 9, 1985

[54] SPARK-PLUG ASSEMBLY FOR INTERNAL-COMBUSTION ENGINE

[75] Inventors: Erich Breuser; Wilhelm Grözinger; Reinhard Latsch, all of Vaihingen; Gernot Würfel, Sinsheim, all of Fed. Rep. of Germany

[73] Assignee: Robert Bosch GmbH, Stuttgart, Fed. Rep. of Germany

[21] Appl. No.: 540,605

[22] Filed: Oct. 7, 1983

[30] Foreign Application Priority Data

Nov. 11, 1982 [DE] Fed. Rep. of Germany ....... 3241697

[51] Int. Cl.³ ............................................. F02B 19/08
[52] U.S. Cl. .................................... 123/266; 123/26; 123/263; 123/256
[58] Field of Search ................. 123/263, 266, 256, 26, 123/169 V

[56] References Cited

U.S. PATENT DOCUMENTS

| 2,153,598 | 4/1939 | Steward | 123/256 |
| 2,646,782 | 7/1953 | Fisher | 123/266 |
| 2,708,428 | 5/1955 | Fisher | 123/169 V |
| 2,738,781 | 3/1956 | Bodine | 123/268 |
| 4,202,307 | 5/1980 | Imanura | 123/169 V |
| 4,214,567 | 7/1980 | Goto | 123/26 |
| 4,416,228 | 11/1983 | Benedikt | 123/266 |

FOREIGN PATENT DOCUMENTS 3025896 2/1982 Fed. Rep. of Germany ...... 123/268

Primary Examiner—Ronald B. Cox
Attorney, Agent, or Firm—Michael J. Striker

[57] ABSTRACT

A spark-plug assembly comprises a fitting mounted on the piston cylinder of an internal-combustion engine and formed with a generally closed firing chamber, at least one firing port extending between the firing chamber and the piston cylinder for fluid communication therebetween, and a storage compartment opening only into the firing chamber. The fitting being provided with a flame-blocking element or formation preventing the entrance of a flame front from the firing chamber into the storage compartment. This firing chamber is open substantially only to the storage compartment and to the piston cylinder. A spark plug has electrodes in the firing chamber. The electrodes form a spark gap lying in the firing chamber between the storage compartment and the port and the storage compartment opens only into the firing chamber.

18 Claims, 16 Drawing Figures

4,509,476

SPARK-PLUG ASSEMBLY FOR INTERNAL-COMBUSTION ENGINE

FIELD OF THE INVENTION

The present invention relates to a spark-plug assembly. More particularly this invention concerns such an assembly which has a combustion chamber.

BACKGROUND OF THE INVENTION

It is known, for example from U.S. Pat. Nos. 1,531,130 and 1,955,628, as well as from British Pat. No. 141,877 and German patent document No. 3,025,896, to employ a fitting with a spark plug to form a firing chamber separate from the respective cylinder chamber. This firing chamber is shaped to facilitate ignition of the fuel-air mixture that powers the engine. The electrodes of the spark plug are provided in this firing chamber, which communicates through ports with the cylinder. Thus when a fuel/air mixture is ignited in the firing chamber it will shoot out through the port or ports as a spike or spikes of flame that effectively ignite the gases in the cylinder chamber.

Such ignition of the gases in the cylinder chamber is quite effective when the engine is idling, particularly when a fairly lean mixture is being used. The torch action is much more effective than a simple spark in igniting a fuel/air mixture, especially in an engine that does not scavenge thoroughly, or as mentioned where a very lean mixture is being used to spare fuel.

A problem with these systems is that they fire very rapidly. The tiny amount of the fuel/air mixture that is forced on the compression stroke into the firing chamber. Thus if a low-octane fuel is used, for example, it is possible to misfire and stall unless the engine timing is perfect.

OBJECTS OF THE INVENTION

It is therefore an object of the present invention to provide an improved spark-plug assembly.

Another object is the provision of such a spark-plug assembly which overcomes the above-given disadvantages, that is which provides a longer ignition burn.

SUMMARY OF THE INVENTION

A spark-plug assembly according to the invention comprises a fitting mounted on the piston cylinder of an internal-combustion engine and formed with a generally closed firing chamber, at least one firing port extending between the firing chamber and the piston cylinder for fluid communication therebetween, and a storage compartment opening only into the firing chamber. The fitting is provided with a flame-blocking element or formation preventing the entrance of a flame front from the firing chamber into the storage compartment. This firing chamber is open substantially only to the storage compartment and to the piston cylinder. A spark plug has electrodes in the firing chamber. The electrodes form a spark gap lying in the firing chamber between the storage compartment and the port and the storage compartment opens only into the firing chamber.

Thus, as the firing chamber is charged with a fuel/air mixture during the compression stroke, the storage compartment will also be filled. Nonetheless on firing of the mixture in the firing chamber, the flame front of the explosion will be stopped short of the storage compartment. Thereafter as the pressure in the firing chamber drops to below that of the storage compartment, the fuel-air mixture therein bleeds back into the firing chamber, replenishing the combustion therein. The result is a substantially longer burn than has been hithereto obtainable, making it possible to ignite and efficiently burn a very lean fuel/air mixture or relatively low-octane fuel.

The flames can be blocked according to this invention by the provision of at least one refill passage extending between the chamber and the compartment and of much smaller flow cross section than the firing port. The flow cross section is so small that the flame front is stopped by it. When, according to the invention the fitting includes an outer part carrying the spark plug and forming a portion of the firing chamber and an insert forming the firing port, forming the rest of the firing chamber, and forming the refill passage with the outer part, the relative coolness of the outer part, in communication with the cylinder-forming engine block, itself extinguishes the flame front. This effect is enhanced when the storage compartment is annular, is defined between the outer part and the insert, and surrounds the insert.

For best heat conduction away from the mixture in the storage compartment the insert and/or the outer part are formed with heat-conducting ribs projecting through the storage compartment, engaging the other part, and forming the refill passages, and even the storage compartment. The heat conduction can be accurately controlled when the firing chamber, the firing port, and the storage compartment are centered on a common axis and the ribs extend axially and are of a cross section increasing axially, normally away from the refill passage.

The refill passage and/or the storage compartment can be annularly continuous. This allows a very compact assembly to be made for best heat conduction with the engine block.

It is also possible to provide a porous body in the refill passage. This body can be fibrous or of metal wool, or it can be a porous metal block.

The storage comparment can open into the firing chamber at the gap or at a location to the other side of the gap from the firing port.

DESCRIPTION OF THE DRAWING

The above and other features and advantages will become more readily apparent from the following, reference being made to the accompanying drawing in which.

SPECIFIC DESCRIPTION

Figure 1:
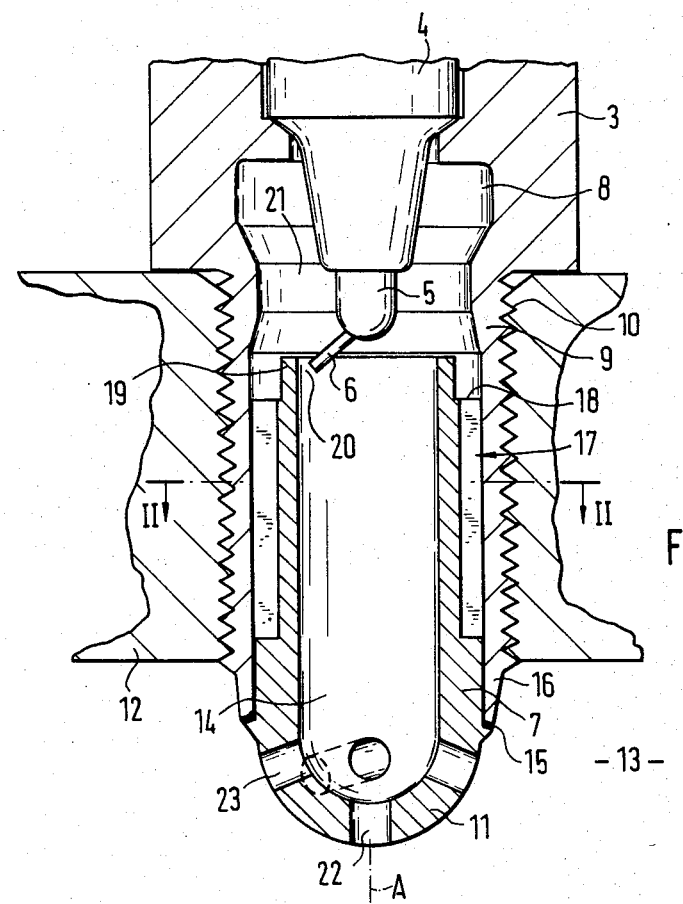
FIG. 1 is an axial section through a first embodiment of the spark-plug assembly according to this invention.
Figure 2:
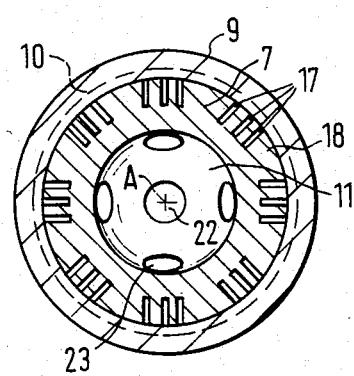
FIG. 2 is a cross section taken along line II—II of FIG. 1.

As seen in FIGS. 1 and 2 a first spark-plug assembly 2 according to this invention has an outer fitting or part 3 centered on an axis A that is here upright, although it is of course possible for the system to be inclined or even upside-down relative to the illustrated position. An insulator 4 having an electrode support 5 carrying a skew electrode 6 is mounted in the top of the fitting 3, and an insert 7 centered on the axis A is fitted into its lower end. The fitting 3 forms a chamber 8 centered on the axis A around the lower end of the insulator 4 and the support 5 and electrode 6, and has a tubular downward extension 9 formed with threads 10 that are engaged in the cylinder wall 12 of an internal-combustion engine. The chamber 8 is of relatively large diameter at the top, of a relatively small diameter therebelow at 21 above the electrode 6 and of intermediate diameter therebelow. The extension 9 has a lower end 16 projecting into a cylinder or combustion chamber 13 of the engine having the wall 12.

The insert 7 has a semispherical lower end 11 centered on the axis A and welded to the lower end 16 at 15. This insert 7 defines a cylindrical interior or chamber 14 also centered on the axis A and extending up to slightly above the lower end of the electrode 6. It is formed, starting from a location well above the weld 15 and even above the inner surface of the wall 12, with eight angularly equispaced sets of three axially extending grooves 17 separated by lands 18 and opening upward into the chamber 8 to form twenty-four downward extensions of this chamber 8. The insert 7 has an annular upper end 19 extending upward beyond these grooves 17 and defining a gap 20 with the electrode 6 so as to form the ground electrode of the system. At its lower end the insert 7 is formed on the axis A with an axially throughgoing port 22, and therearound with four identical ports 23 extending off-radially and inclined downward.

This arrangement 2 functions as follows:

During the compression stroke of the engine a mixture of fuel and air is forced through the ports 22 and 23 into the interior 14 of the insert 11. That portion coming straight in the port 22 will move directly as a straight stream up toward the electrode 6 and the portion entering via the ports 23 will swirl helically upward in the insert chamber 14. The liquid fuel droplets in this latter portion constitutes a heavier phase that, due to the increased centrifugal force effective on it, moves radially outward, concentrating the fuel along the walls of the chamber 14. This concentration along the wall, where the gap 20 is located, allows a relatively lean fuel/air mixture to be ignited. Some of the fuel/air mixture is driven back down into the grooves 17.

Normally the plug fires just before the piston reaches the upper limit of its travel, that is the end of the compression stroke. The spark ignites the fuel, causing a flame front to move outward from the gap 20. This combustion greatly increases the pressure inside the spark-plug assembly 2 which rises to a level above that in the chamber 13, so that the burning mixture shoots as five spikes of flame out of the holes 22 and 23 into the cylinder 13, effectively igniting the compressed fuel-air mixture therein.

The cross-sectional size of the downwardly blind compartments formed by the grooves 17 is quite small, and is intimately associated through the thin extension 9 with the relatively cool wall 12 of the cylinder 13. As a result the fuel-air mixture in these grooves 17 does not burn; the flame front is extinguished at their upper ends. Once, however, the pressure in the chambers 8, 21, and 14 has dropped somewhat, the pressurized mixture in these grooves 17 starts to move up out of them. This action replenishes the chamber 14 with fuel, so that combustion either continues or starts again therein. As a result the spikes of flame or torch action of the assembly 2 is relatively long lived and combustion in the cylinder 13 is excellent, allowing even a fairly lean fuel/air mixture or a poorly scavenged cylinder still containing substantial exhaust gases from the previous cycle to burn effectively.

The grooves 17 are all identical and each have an angular dimension that is less than half their radial dimension and also less than half the doubled distance by which the flame front can approach a wall. Thus these grooves 17 block the entrance of flames into themselves.

Figure 3:
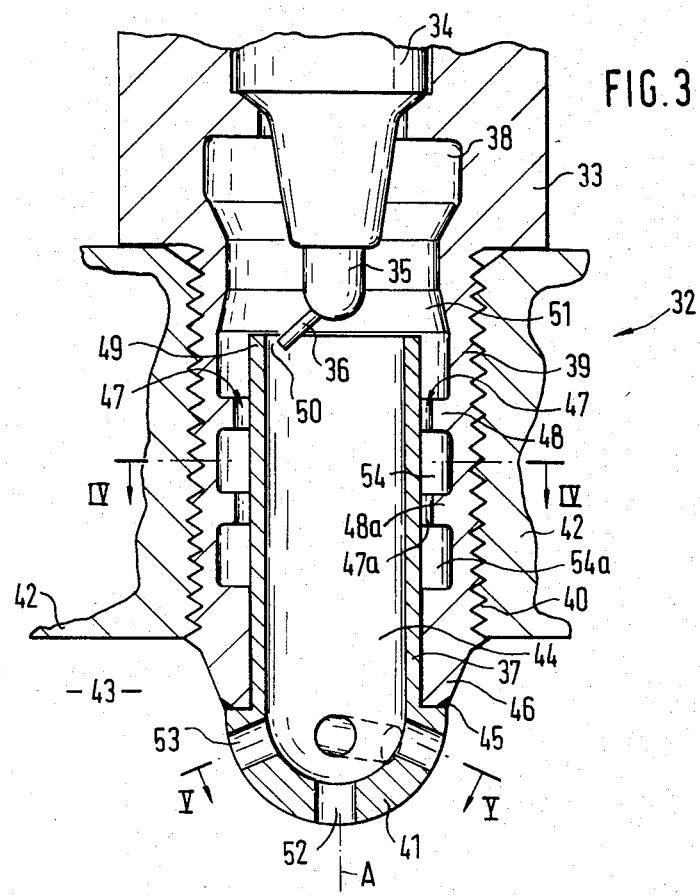
FIG. 3 is an axial section through a second embodiment of the instant invention.
Figure 4:
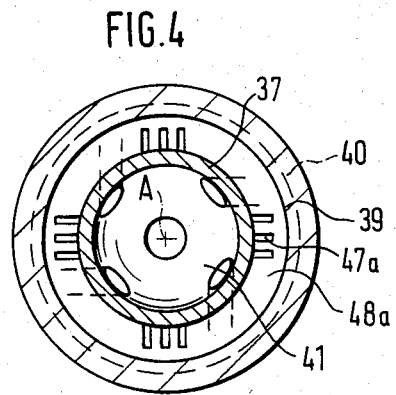
FIGS. 4 and 5 are cross sections taken respectively along lines IV—IV and V—V of FIG. 3.
Figure 5:
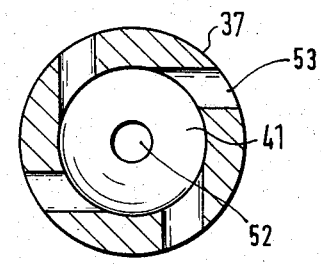

FIGS. 3, 4, and 5 show a second spark-plug assembly 32 which has an outer fitting or part 33 centered on an axis A. An insulator 34 having an electrode support 35 carrying a skew electrode 36 is mounted in the top of the fitting 33, and an insert 37 centered on the axis A is fitted into its lower end. The fitting 33 forms a chamber 38 centered on the axis A around the lower end of the insulator 34 and the support 35 and electrode 36, and has a tubular downward extension 39 formed with threads 40 that are engaged in the cylinder wall 42 of an internal-combustion engine. The chamber 38 is of relatively large diameter at the top and of a smaller diameter therebelow at 51. The extension 39 has a lower end 46 projecting into a cylinder or combustion chamber 43 of the engine having the wall 42.

The insert 37 has a semispherical lower end 41 centered on the axis A and welded to the lower end 46 at 45. This insert 37 defines a cylindrical interior or chamber 44 centered on the axis A and extending up to slightly above the lower end of the electrode 36. It is formed, starting from a location well above the weld 45 and even above the inner surface of the wall 42, with two annular and outwardly open grooves 48 and 48a. The upper groove 48 is open upward into the chamber 38 via four angularly equispaced sets of three outwardly open and axially extending grooves 47 identical in cross section to the grooves 17 of FIGS. 1 and 2. The grooves 48 and 48a communicate with each other via identical such grooves 47a, and are of the same outer diameter as the lower portion of the chamber 38. The insert 37 has an annular upper end 49 extending upward beyond the grooves 47 and defining a gap 50 with the electrode 36 so as to form the ground electrode of the system. At its lower end the insert 37 is formed on the axis A with an axially throughgoing port 52, and therearound with four identical ports 53 extending off-radially and inclined downward.

This arrangement 32 functions substantially as described with reference to FIGS. 1 and 2, except that the amount of fuel/air mixture stored in the chambers 54 and 54a is relatively large, so that as it flows back out it will increase the overall burn time of the assembly 32 considerably. Thus even relatively lean mixtures of relatively low-octane fuel will be ignited.

Figure 6:
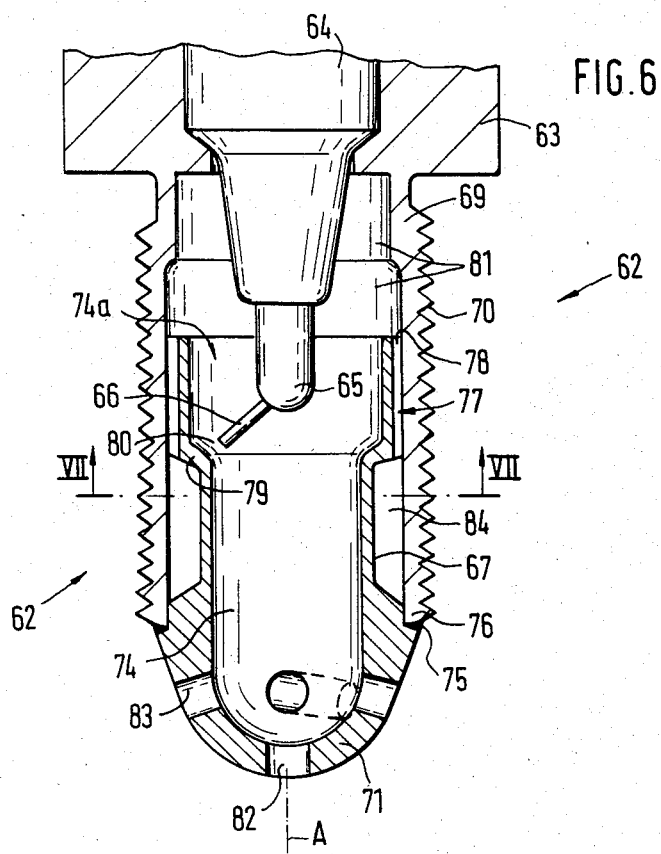
FIG. 6 is an axial section through a third embodiment of the invention.
Figure 7:
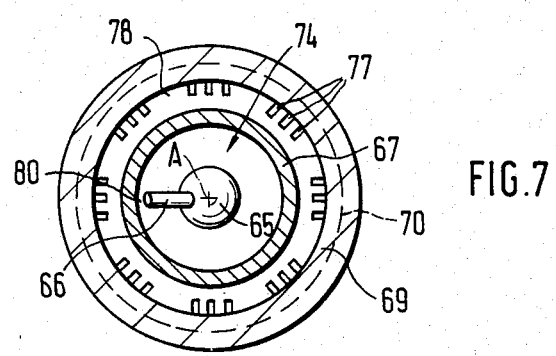
FIG. 7 is a cross section taken along line VII—VII of FIG. 6.

FIGS. 6 and 7 show a third spark-plug assembly 62 which has an outer fitting or part 63 centered on an axis A. An insulator 64 having an electrode support 65 carrying a skew electrode 66 is mounted in the top of the fitting 63, and an insert 67 centered on the axis A is fitted into its lower end. The fitting 63 forms a chamber 81 centered on the axis A around the lower end of the insulator 64 and the support 65 and electrode 66, and has a tubular downward extension 69 formed with threads 70 that are engaged in the cylinder wall of an internal-combustion engine. The chamber 81 is of small diameter at the top and of a greater diameter therebelow. The extension 69 has a lower end 76 projecting into a cylinder or combustion chamber of an internal-combustion engine, as in the other above-described embodiments.

The insert 67 has a semispherical lower end 71 centered on the axis A and welded to the lower end 76 at 75. This insert 67 defines a cylindrical interior or chamber 74 centered on the axis A and having a large-diameter upper portion 74a extending up well above the electrode 66. It is formed, starting from a location well above the weld 75 and even above the inner surface of the cylinder wall, with an annular and outwardly open groove 84 that opens upward into the chamber 81 via eight angularly equispaced sets of three outwardly open and axially extending grooves 77 identical in cross section to the grooves 17 of FIGS. 1 and 2 and separated by lands 78. The insert 67 has an annular upper end 79 extending upward beyond the grooves 47 and beyond the electrode 66 and defining a gap 80 with the electrode 66 so as to form the ground electrode of the system. At its lower end the insert 67 is formed on the axis A with an axially throughgoing port 82, and therearound with four identical ports 83 extending off-radially and inclined downward.

This arrangement 62 functions substantially as described with reference to FIGS. 1 and 2, except that the amount of fuel/air mixture stored in the chamber 84 is relatively large, so that as it flows back out it will increase the overall burn time of the assembly 62 considerably. The considerable upward extension of the insert 67 past the electrode 66 ensures that the stored and unignited fuel/air mixture from the storage chamber 84 will thoroughly sparge out the chamber 81.

Figure 12:
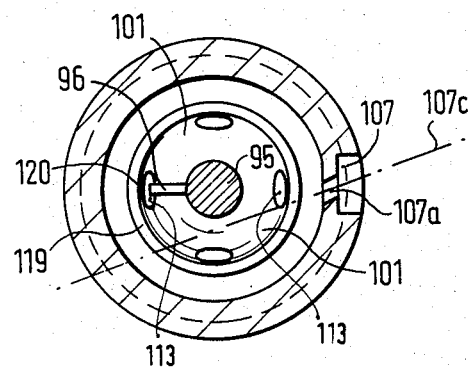

The third assembly 92 of FIGS. 8–12 has an outer fitting or part 93 centered on an axis A. An insulator 94 having an electrode support 95 carrying a skew electrode 96 is mounted in the top of the fitting 93, and an insert 97 centered on the axis A is fitted into its lower end. The fitting 93 forms a chamber 111 centered on the axis A around the lower end of the insulator 94 and the support 95 and electrode 96, and has a tubular downward extension 99 formed with threads 100 that are engaged in the cylinder wall 102 of an internal-combustion engine. The extension 99 has a lower end 106 projecting into a cylinder or combuston chamber 103 of the engine having the wall 102 and is formed with an outwardly open and axially extending groove or passage 107 that opens radially inwardly into the chamber 111 at its upper end via a bore 107a and radially inwardly at its lower end via a passage 107b. The bore 107a is centered as shown in FIG. 12 on an off-radial line 107c lying in a plane perpendicular to the axis A.

The insert 97 has a semispherical lower end 101 centered on the axis A and welded to the lower end 106 at 105. This insert 97 defines a cylindrical interior or chamber 104 centered on the axis A and extending up to slightly below the lower end of the electrode 96. It is formed, starting from a location above the weld 105 with eight angularly equispaced and radially outwardly projecting ribs 115 defining axially extending compartments 116. The tubular extension 99 of the insert 93 has a radially inwardly projecting ridge 108 lying between the bores 107a and 107b and radially engaging the insert 97 above the ribs 115, forming an annular compartment 114 therabove. The bore 107b opens into this compartment 114. The insert 97 has an annular upper end 119 extending upward beyond the rib 108 and defining a gap 120 with the electrode 96 so as to form the ground electrode of the system. These ribs 115 are of thickness measured angularly that increases axially away from the electrode 96. These ribs 115 could be subdivided axially into several adjacent parts. At its lower end the insert 97 is formed on the axis A with an axially throughgoing port 112, and therearound with four identical ports 113 extending off-radially and inclined downward.

This arrangement 92 functions substantially as described with reference to FIGS. 1 and 2, except that the fuel/air mixture enters the chambers 114 and 116 through the circuitous route defined by the bore 107a, the groove 107, and the bore 107b. This construction absolutely prevents ignition of the mixture stored in these chambers 114 and 116, which are therefore available to replenish the flame during the power stroke of the engine as described above. The tangential or off-radial orientation of the bore 107a causes the mixture emerging from it to swirl and to concentrate the fuel in the outer regions, just like that entering through the bores 113, so as to facilitate its combustion.

Figure 13:
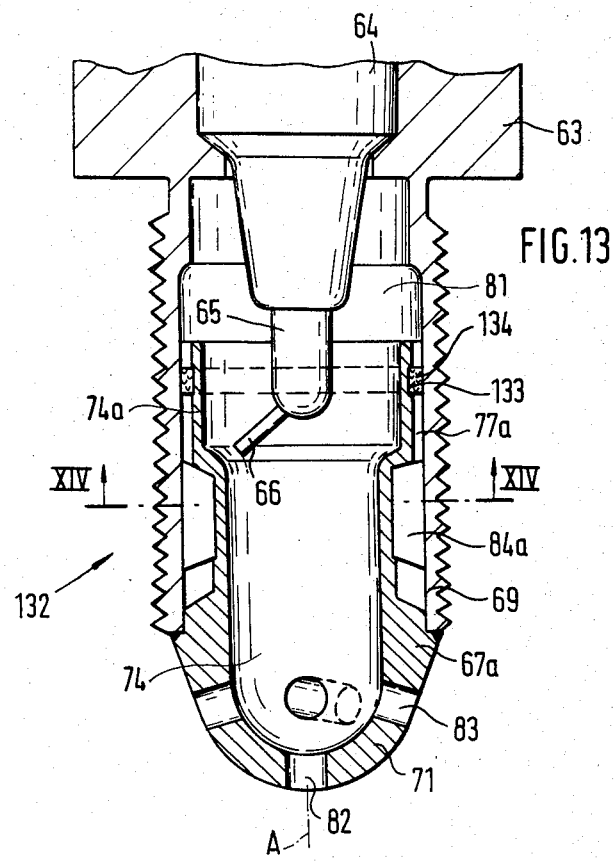
FIG. 13 is an axial section through a fifth embodiment of the invention.
Figure 14:
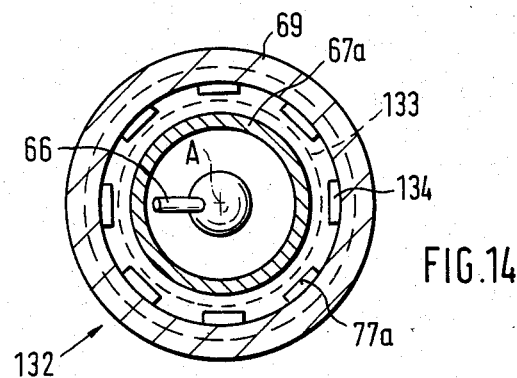
FIG. 14 is a cross section taken along line XIV—XIV of FIG. 6.

FIGS. 13 and 14 show a fifth spark-plug assembly 132 similar to that of FIGS. 6 and 7 and having an outer fitting or part 63 centered on an axis A. An insulator 64 having an electrode support 65 carrying a skew electrode 66 is mounted in the top of the fitting 63, and an insert 67a centered on the axis A is fitted into its lower end. The fitting 63 forms a chamber 81 centered on the axis A around the lower end of the insulator 64 and the support 65 and electrode 66, and has a tubular downward extension 69 formed with threads that are engaged in the cylinder wall of an internal-combustion engine.

The insert 67a has a semispherical lower end 71 centered on the axis A and defines a cylindrical interior or chamber 74 centered on the axis A and having a large-diameter upper portion 74a extending up well above the electrode 66. It is formed with an annular and outwardly open groove 84a that opens upward into the chamber 81 via eight angularly equispaced and axially extending grooves 77a. A fiber ring 134 is set into a radially outwardly open groove 133 formed in the upper portion of the insert 67a, generally blocking the grooves 77a. At its lower end the insert 67a is formed on the axis A with an axially throughgoing port 82, and therearound with four identical ports 83 extending off-radially and inclined downward.

This arrangement 132 functions substantially as described with reference to FIGS. 6 and 7, except that the fiber ring 134 effectively prevents flame from moving along the grooves 77a, which are of substantially greater flow cross section than the grooves 77. The ring 134 can be formed of metal fibers, porous ceramic, sintered metal, or any other material that will let gas and atomized fuel pass, but that will block flame.

Figure 8:
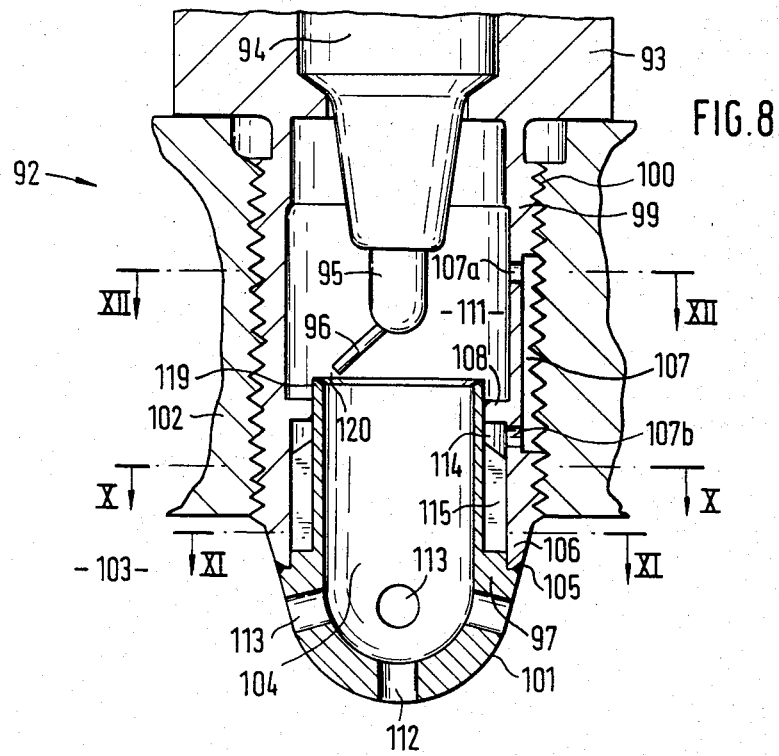
FIG. 8 is an axial section through a fourth embodiment of the invention.
Figure 9:
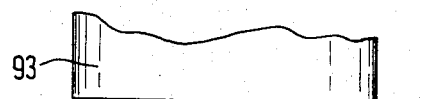
FIG. 9 is a side view of a portion of the fourth embodiment.
Figure 10:
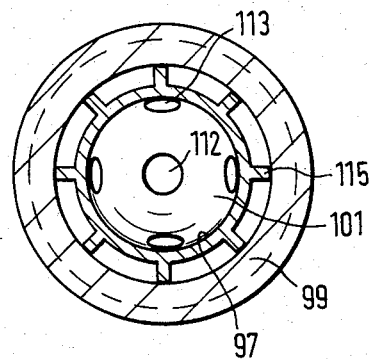
FIGS. 10, 11, and 12 are cross sections taken respectively along lines X—X, XI—XI, and XII—XII of FIG. 8.
Figure 11:
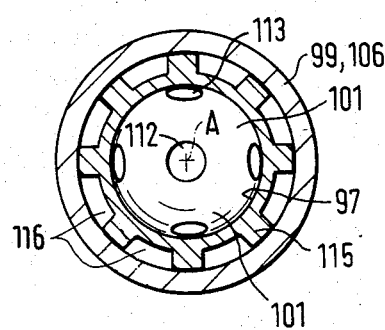
Figure 15:
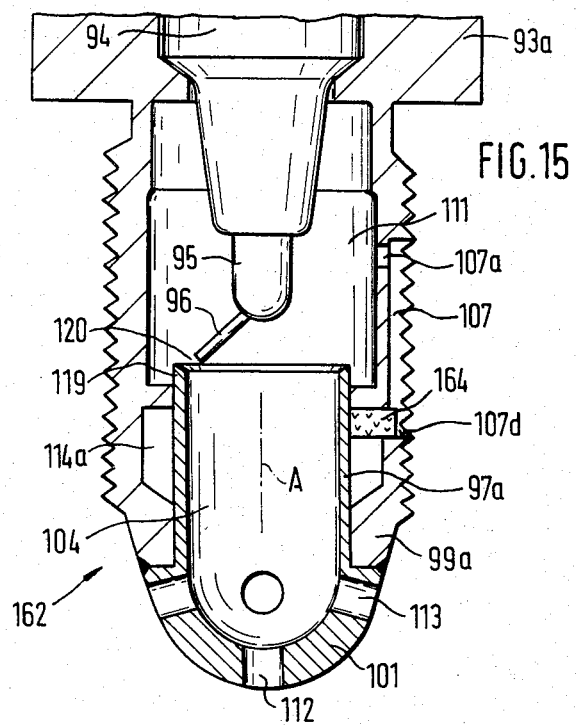
FIG. 15 is an axial section through a sixth embodiment of the invention.
Figure 16:
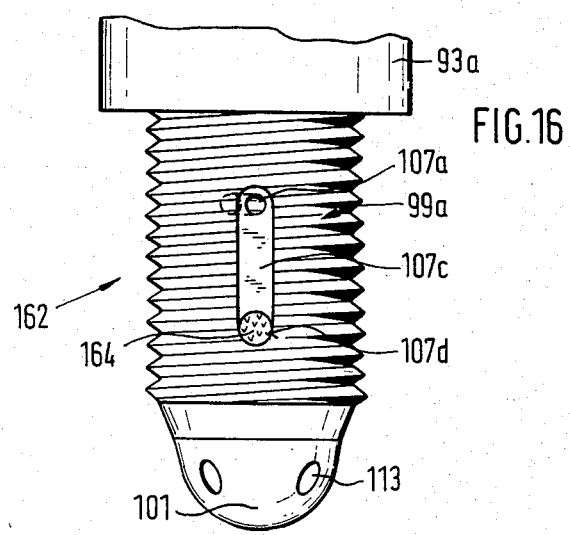
FIG. 16 is a side view of the sixth embodiment.

The sixth assembly 162 of FIGS. 15 and 16 is similar to that of FIGS. 8 and 9 and has an outer fitting or part 93 centered on an axis A. An insert 97a here is substantially identical to the insert 97, but has a large diameter lower bore 107d equivalent to the bore 107b but provided with a porous plug 164 that functions like the ring 134 of FIGS. 13 and 14.

The use of a separate flame-blocking element as described with refernce to FIGS. 13 through 16 facilitates assembly of the unit, and prevents burning of the stored vapor charge even when the assembly is very hot.

We claim:

1. In combination with an internal-combustion engine having a piston cylinder, a wall covering the piston cylinder and delimiting therewith a combustion chamber, and a spark-plug assembly comprising:
    a fitting mounted in said wall and formed with a generally closed firing chamber;
    a spark plug having electrodes in the firing chamber; the fitting including
    an outer part carrying the spark plug and forming a normally upper portion of the firing chamber, and
    an electrically conductive insert forming a normally lower portion of the firing chamber;
    at least one firing port extending between the lower portion of the firing chamber and the combustion chamber for fluid communication therebetween;
    at least one storage compartment arranged between the outer part and the insert and opening only into the upper portion of the firing chamber, the fitting being provided with means preventing the entrance of a flame front from the firing chamber into the storage compartment; the electrodes forming a spark gap lying in the firing chamber between the upper and lower portions thereof; and
    the electrically conductive insert being one of said electrodes.

2. The spark plug assembly as defined in claim 1 wherein the insert has a normally lower end formed with the firing port.

3. The spark plug assembly as defined in claim 1 wherein the storage compartment and the preventing means are formed in the insert.

4. The spark plug assembly as defined in claim 2 wherein the outer part of the fiting surounds the insert and the storage compartment and the preventing means are formed in the outer part.

5. The spark-plug assembly defined in claim 1 wherein the means is a refill passage extending between the chamber and the compartment and of such a small flow cross section as to quench a flame.

6. The spark-plug assembly defined in claim 5 wherein the fitting includes
    an outer part carrying the spark plug and forming a portion of the firing chamber; and
    an insert forming the firing port, forming the rest of the firing chamber, and forming the refill passage with the outer part.

7. In combination with an internal-combustion engine having a piston cylinder, a spark-plug assembly comprising:
    a fitting mounted on the cylinder and formed with a generally closed firing chamber,
        at least one firing port extending between the firing chamber and the piston cylinder for fluid communication therebetween,
        a storage compartment opening only into the firing chamber, the fitting being provided with means preventing the entrance of a flame front from the firing chamber into the storage compartment, the firing chamber being open substantially only to the storage compartment and to the piston cylinder;
    a spark plug having electrodes in the firing chamber;
    forming a spark gap lying in the firing chamber between the storage compartment and the port, the storage compartment opening only into the firing chamber;
    the means being a refill passage extending between the chamber and the compartment and of much smaller flow cross section than the firing port;
    the fitting including
    an outer part carrying the spark plug and forming a portion of the firing chamber;
    an insert forming the firing port, forming the rest of the firing chamber, and forming the refill passage with the outer part; and wherein the means is a plurality of such refill passages.

8. The spark-plug assembly defined in claim 1 wherein the storage compartment is annular, and surrounds the insert.

9. The spark-plug assembly defined in claim 7 wherein the insert constitutes an inner part, one of the inner and outer parts being formed with heat-conducting ribs projecting through the storage compartment, engaging the other part, and forming the refill passages.

10. The spark-plug assembly defined in claim 9 wherein the firing chamber, the firing port, and the storage compartment are centered on a common axis, the ribs extending axially and of a cross section increasing axially.

11. The spark-plug assembly defined in claim 9 wherein the refill passage is annularly continuous.

12. The spark-plug assembly defined in claim 8 wherein the storage compartment is annularly continuous.

13. The spark-plug assembly defined in claim 1 wherein the insert is threaded into the outer part.

14. In combination with an internal-combustion engine having a piston cylinder, a spark-plug assembly comprising:
    a fitting mounted on the cylinder and formed with a generally closed firing chamber,
        at least one firing port extending between the firing chamber and the piston cylinder for fluid communication therebetween,
    a storage compartment opening only into the firing chamber, the fitting being provided with means preventing the entrance of a flame front from the firing chamber into the storage compartment, the firing chamber being open substantially only to the storage compartment and to the piston cylinder;
    a spark plug having electrodes in the firing chamber;
    the electrodes forming a spark gap lying in the firing chamber between the storage compartment and the port, the storage compartment opening only into the firing chamber; and wherein the means is a refill passage extending between the storage compartment and the firing chamber and a porous body in the refill passage.

15. The spark-plug assembly defined in claim 14 wherein the body is of metal wool.

16. The spark-plug assembly defined in claim 14 wherin the body is a porous metal block.

17. The spark-plug assembly defined in claim 1 wherein the storage compartment opens into the firing chamber at the gap.

18. The spark-plug assembly defined in claim 1 wherein the storage compartment opens into the firing chamber at a location and the gap lies between the location and the firing port.

* * * * *